United States Patent [19]
Meinherz

[11] Patent Number: 6,127,641
[45] Date of Patent: Oct. 3, 2000

[54] HIGH-VOLTAGE SWITCHGEAR

[75] Inventor: Manfred Meinherz, Berlin, Germany

[73] Assignee: Siemens Aktiengesellschaft, Munich, Germany

[21] Appl. No.: 09/242,189

[22] PCT Filed: Aug. 6, 1997

[86] PCT No.: PCT/DE97/01694

§ 371 Date: May 28, 1999

§ 102(e) Date: May 28, 1999

[30] Foreign Application Priority Data

Aug. 13, 1996 [DE] Germany ............... 296 14 799 U

[51] Int. Cl.⁷ ............... H01H 33/02; H02B 13/02; H05K 5/00
[52] U.S. Cl. ............... 218/43; 174/18; 361/605; 218/68; 218/79
[58] Field of Search ............... 361/604, 612, 361/618, 600–603, 605–611, 613–617, 619–628; 218/43, 48, 49, 50, 44–47, 55, 56, 72, 68, 79, 152, 51–54, 153–158; 174/18

[56] References Cited

U.S. PATENT DOCUMENTS

| | | | |
|---|---|---|---|
| 3,665,135 | 5/1972 | Boersma et al. | 200/253 |
| 4,016,382 | 4/1977 | Roth | 218/43 |
| 4,255,632 | 3/1981 | Backskog | 218/55 |
| 4,440,998 | 4/1984 | McConnell et al. | 361/605 X |

FOREIGN PATENT DOCUMENTS

| | | |
|---|---|---|
| 0 405 253 | 1/1992 | European Pat. Off. |
| 0 560 588 | 9/1993 | European Pat. Off. |
| 1 371 871 | 8/1964 | France |
| 1 530 230 | 5/1968 | France |
| 2 111 871 | 6/1972 | France |
| 2 435 843 | 4/1980 | France |
| 2 028 327 | 9/1971 | Germany |
| 39 15 699 | 11/1990 | Germany |
| 296 14 799 U | 10/1996 | Germany |
| 558 092 | 1/1975 | Switzerland |

*Primary Examiner*—J. R. Scott
*Attorney, Agent, or Firm*—Kenyon & Kenyon

[57] ABSTRACT

An attachment of high-voltage lead-in insulators (1, 1') on enclosure housings (1, 1') using elbow-shaped additional housings which have rotary joints to allow the insulators to rotate in order to maintain a connection distance.

10 Claims, 2 Drawing Sheets

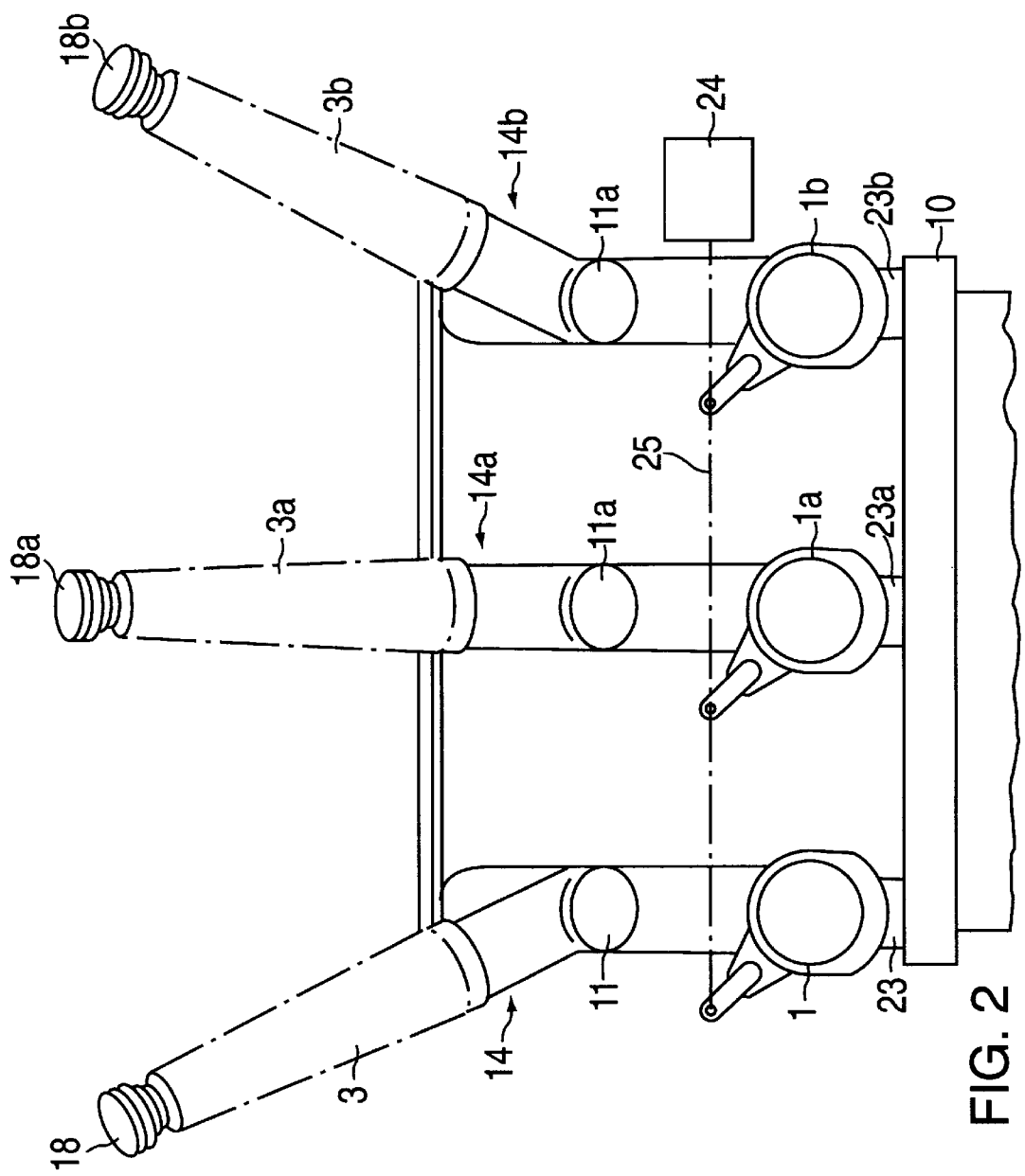

HIGH-VOLTAGE SWITCHGEAR

FIELD OF THE INVENTION

The present invention relates to a three-pole, gas-insulated high-voltage switchgear having three metallic enclosure housings arranged next to one another, one for each circuit breaker, in which two lead-in insulators are arranged on each enclosure housing, and the lead-in insulators of both outer enclosure housings are laterally inclined away from the central enclosure housing.

BACKGROUND INFORMATION

European Patent No. 0 560 588 describes that a required insulating distance is provided between terminals of both lead-in insulators of an enclosure housing of each pole of a high-voltage switchgear accommodating a circuit breaker by arranging the lead-in insulators so that they are inclined away from one another forming a symmetrical V shape. In order to maintain the required insulating distance between the terminals of the lead-in insulators of adjacent enclosure housings of a three-pole, gas-insulated, metal-enclosed high-voltage switchgear that accommodate the circuit breaker, according to European Patent No. 0 405 253, the two outer enclosure housings of the three adjacent enclosure housings are rotated about their longitudinal axes. This requires not only that different terminals be provided for the enclosure housings, but also that there be expensive connecting webs for a ground electrode and an isolating switch and their drives, since these are not in the same plane due to the rotation of the outer enclosure housing.

According to Swiss Patent No. 558 092, lead-in insulators of metal-enclosed high-voltage switchgear can be arranged with their terminals on an enclosure housing via an additional housing having two housing parts connected by a swiveling device, so that the lead-in insulators of each enclosure housing can be swivelled into a position where they are symmetrically inclined away from one another. However, use of the additional housing to accommodate an isolating switch is made difficult with the switchgear described therein due to the swiveling of the lead-in insulators from their transport position into their operating position.

SUMMARY

The object of the present invention is to provide a high-voltage switchgear that allows the lead-in insulators to swivel into their operating position, with isolating switches arranged in a more favorable manner to ensuring their reliable operation.

This object is achieved according to the present invention by the fact that each of the lead-in insulators of the two outer enclosure housings is connected to a respective additional housing constituting an elbow-shaped housing, first leg being attached to respective enclosure housing and a second leg, perpendicular to its longitudinal axis, supporting the lead-in insulator, and the second leg having a rotational joint rotatable about the longitudinal axis of the second leg.

Thus the lead-in insulators may swivel without requiring the respective enclosure housing or a stationary part of the respective additional housing to move. Different additional housings may therefore be connected using fixed braces, and the switchgear located in the additional housings may be jointly actuated using a drive mechanism independent of the swivel position of the lead-in insulators.

In order to make it easier for the lead-in insulators of the two outer poles to swivel into their operating position, according to a preferred embodiment each of these lead-through insulators is essentially perpendicular to the second leg.

The first leg of each additional housing may also advantageously have a rotating joint rotatable about the longitudinal axis of the first leg.

Each additional housing may also be advantageously connected to a connection piece, provided on a lateral surface of a cylindrical enclosure housing and inclined outward at an acute angle to its longitudinal axis.

Taking into consideration the swiveling of the lead-in insulators of the two outer poles into the operating position allowed by the present invention, advantageous embodiments are also obtained for mounting an isolating switch in the additional housing.

As a result of this embodiment, the additional housings extend in an axial direction of the enclosure housing away from each other and may be attached to the enclosure housing in a simple and reliable manner.

According to another advantageous embodiment of the present invention, at least one additional housing accommodates an isolating switch.

Thus the enclosure housing may be made particularly small, since it only has to accommodate the circuit breaker unit, but not an isolating switch. The isolating switches are mounted in an additional housing in a compact manner so they are easily accessible.

Furthermore, the present invention may be advantageously designed so that both contacts of the isolating switch are located in the central part of the additional housing between the rotating joints.

The terminals of the isolating switch may then be led out on the rotary joints of the additional housing using a rotatable plug-and-socket connection.

The present invention may also be advantageously designed by arranging the a drivable contact of the isolating switch on one side of one of the rotating joints of an additional housing and the stationary contact on the other side.

With such a design, the switching contact of the isolating switch is simultaneously used as a rotatable electric plug-and-socket connection, so that no other measures are needed to rotate the additional housing using a rotary joint in the area of the isolating switch.

Since the outer poles themselves are no longer rotated according to the present invention, the three enclosure housings now have identical terminals and, since in some embodiments, the isolating switch and the ground electrode of the three poles maintain their parallel arrangement despite swiveling into the operating position, the connection gear that connects them remains in line or at least has a simple design.

A common drive for the isolating switches or the grounding switches may be advantageously coupled to them.

BRIEF DESCRIPTION OF THE DRAWINGS

FIG. 2 shows a front view of a three-pole, gas-insulated, metal enclosed high-voltage switchgear with an embodiment of the three-poles as shown in FIG. 1.

DETAILED DESCRIPTION

Detailed Description

Figure 1:
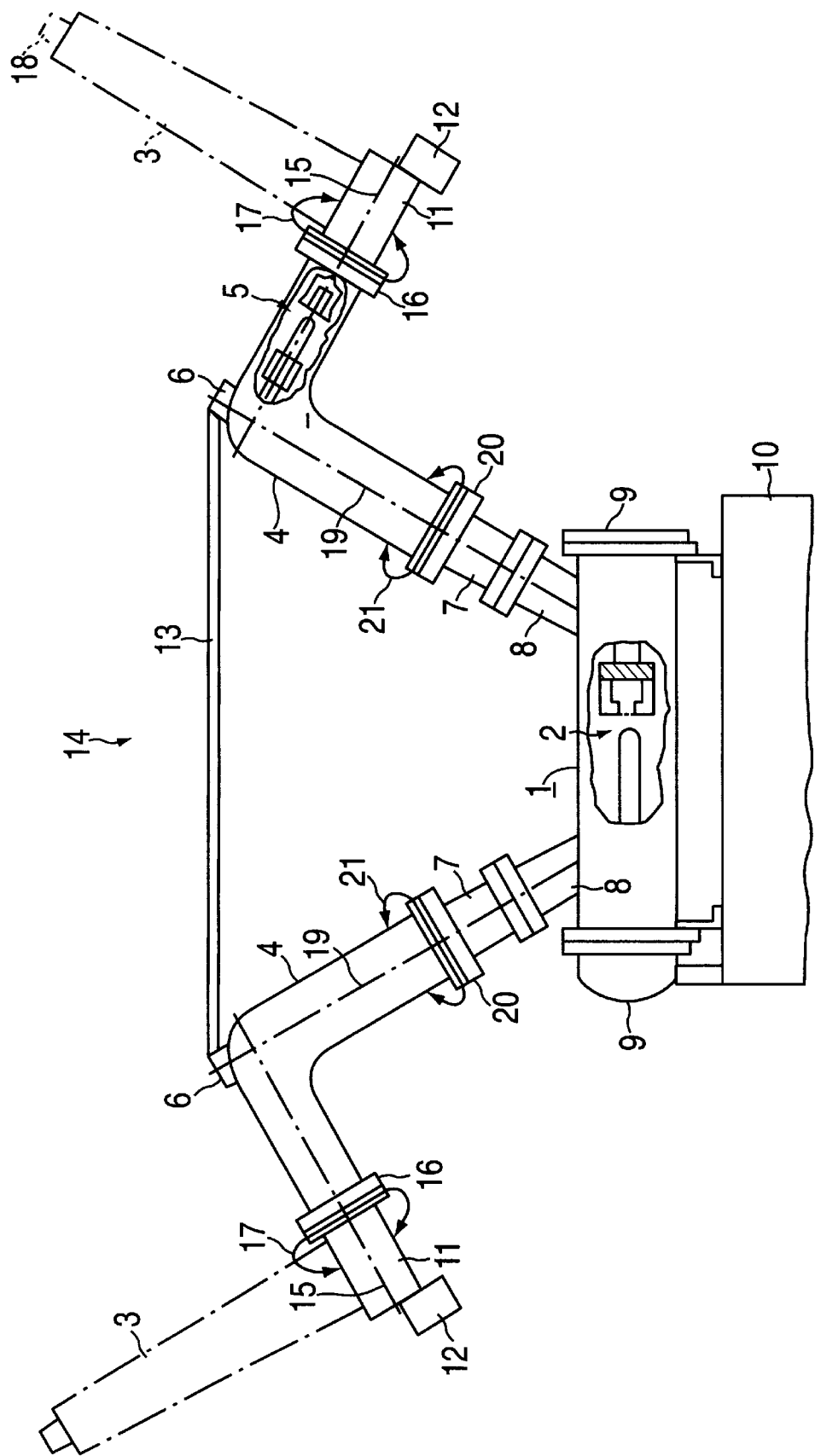
FIG. 1 shows a side view of a pole of a three-pole, gas-insulated, metal enclosed high-voltage switchgear according to the present invention.

As FIG. 1 shows, central enclosure housing 1, which houses circuit breaker 2, accommodates two lead-in insulators 3, which are symmetrically inclined away from one another in order to guarantee sufficient space to other terminals for the respective overhead line terminal. Lead-in insulators 3 are accommodated with an additional housing 4, in which there is an insulating switch 5 and a ground electrode 6, connected between them. In the example embodiment shown in FIG. 1, additional housing 4 is, for example, an elbow-shaped housing. Additional housing 4 is connected, via a part 7 of additional housing 4, accommodating a current transformer (not shown), and via a connection piece 8, to central enclosure housing 1 forming an acute angle with sides 9 of central enclosure housing 1 mounted on rack 10 of the high-voltage switchgear. Lead-in insulators 3 are fastened to a part 11 of additional housing 4, on which high-speed grounding switch 12 is located. Brace element 13 is used to stabilize the additional housing with lead-in insulators 3, 3a, and 3b. Part 7 forms, together with the central part of additional housing 4, the first leg of the additional housing. Part 11, 11a, 11b forms, together with the central part of additional housing 4, the second leg of the additional housing.

In order for lead-in insulators 3, 3a, 3b of a three-pole high-voltage switchgear to assume the position illustrated in FIG. 2, in which lead-in insulators 3, 3b of the two outer poles 14, 14b are also inclined in relation to one another in a plane perpendicular to the first plane of inclination, these lead-in insulators 3, 3b are rotatable perpendicularly to their longitudinal axis 15 in the direction of arrow 17, i.e., outward, via a flange-type rotating joint 16 of additional housing 4, as shown in FIG. 1.

An insulation gap between terminals 18, 18b of lead-in insulators 3, 3a, 3b of adjacent enclosure housings 1, 1a, 1b may be set, according to FIG. 1, due to the fact that each additional housing 4, rotatably connected to central enclosure housing 1, is also connected rotatably about its axis 19 to connecting piece 8 via a flange-type rotating joint 20, so that lead-in insulators 3, 3a, 3b may be moved by rotating additional housing 4 in the direction of arrow 21 about axis 19 and about axis 15.

Of course, the attainment of the effects intended by the present invention is not dependent on a 90° arrangement of lead-in insulators 3, 3a, 3b with respect to additional housing 4, but these may also be arranged at any angle other than 180°.

FIG. 2 also shows that both for outer poles 14, 14b and for inner pole 14a the same terminals 23, 23a, 23b may be used for enclosure housings 1, 1a, 1b, and connecting gears 25 actuated by motor drive 24 for all insulating switches 5, ground electrodes 6, and high-speed grounding switches 10, may be aligned.

What is claimed is:

1. A three-pole, gas-insulated high-voltage switchgear, comprising:

three metallic enclosure housings arranged next to one another, each of the three metallic enclosure housings for enclosing a respective circuit breaker, the three metallic enclosure housings including two outer enclosure housings and a central enclosure housing; and two respective lead-in insulators arranged on each of the two outer enclosure housings and the central enclosure housing, each of the two respective lead-in insulators arranged on each of the two outer enclosure housings being inclined laterally away from the central enclosure housing and being coupled to a respective one of the two outer enclosure housings via a respective elbow-shaped housing, a first leg of the respective elbow-shaped housing being attached to the respective one of the two outer enclosure housings, and a second leg of the respective elbow-shaped housing supporting the respective lead-in insulator, the second leg extending transversely to a longitudinal axis of the first leg, the second leg including a first rotating joint, the first rotating joint being rotatable about a longitudinal axis of the second leg.

2. The switchgear according to claim 1, wherein each of the two lead-in insulators arranged on each of the two outer enclosure housings is arranged perpendicularly with respect to the second leg of the respective elbow-shaped housing.

3. The switchgear according to claim 1, wherein the first leg of each respective elbow-shaped housing has a second rotating joint rotatable about the longitudinal axis of the second leg of the respective elbow-shaped housing.

4. The switchgear according to claim 2, wherein each respective elbow-shaped housing is connected to a connecting piece formed on a lateral surface of one of the two outer enclosure housings, the connecting piece being outwardly inclined at an acute angle in relation to a longitudinal axis of the one of the two outer enclosure housings.

5. The switchgear according to claim 1, wherein at least one respective elbow-shaped housing accommodates an isolating switch.

6. The switchgear according to claim 5, wherein contacts of the isolating switch are arranged in a central part of the at least one respective elbow-shaped housing between the first rotating joint and a second rotating joint.

7. The switchgear according to claim 5, wherein a drivable contact of the isolating switch and a stationary contact of the isolating switch are arranged on both sides of one of the first rotating joint and a second rotating joint of the at least one respective elbow-shaped housing.

8. The switchgear according to claim 1, wherein at least one respective elbow-shaped housing accommodates a grounding switch.

9. The switchgear according to claim 1, wherein at least one respective elbow-shaped housing accommodates at least one of a current transformer and a voltage transformer.

10. The switchgear according to claim 1, wherein switchgear arranged in the respective elbow-shaped housing are actuatable as a group by a driving mechanism using a drive gear, the switchgear being arranged in parallel to switching axes.

\* \* \* \* \*